(12) United States Patent
Yi

(10) Patent No.: US 12,542,293 B2
(45) Date of Patent: Feb. 3, 2026

(54) ION CONDUCTING LAYER FOR FUEL CELLS SUPPRESSING CROSSOVER PHENOMENON AND FUEL CELL COMPRISING THE SAME

(71) Applicant: Jung Seok Yi, Seoul (KR)

(72) Inventor: Jung Seok Yi, Seoul (KR)

(*) Notice: Subject to any disclaimer, the term of this patent is extended or adjusted under 35 U.S.C. 154(b) by 648 days.

(21) Appl. No.: 18/058,079

(22) Filed: Nov. 22, 2022

(65) Prior Publication Data

US 2023/0197993 A1 Jun. 22, 2023

(30) Foreign Application Priority Data

Dec. 17, 2021 (KR) ........................ 10-2021-0181753

(51) Int. Cl.
*H01M 8/1067* (2016.01)
*H01M 8/04082* (2016.01)
*H01M 8/1009* (2016.01)
*H01M 8/2455* (2016.01)

(52) U.S. Cl.
CPC ..... *H01M 8/1067* (2013.01); *H01M 8/04197* (2016.02); *H01M 8/1009* (2013.01); *H01M 8/2455* (2013.01)

(58) Field of Classification Search
CPC .......... H01M 8/1067; H01M 8/04197; H01M 8/1009; H01M 8/2455; H01M 4/8605; H01M 8/1004; H01M 8/04186; H01M 8/1011

See application file for complete search history.

(56) References Cited

U.S. PATENT DOCUMENTS

| | | | | |
|---|---|---|---|---|
| 2006/0088744 A1* | 4/2006 | Markoski | ................ | H01M 8/08 429/513 |
| 2014/0147758 A1* | 5/2014 | Akiyama | ............ | H01M 8/1009 429/410 |
| 2020/0044271 A1* | 2/2020 | Kim | ..................... | H01M 8/1067 |
| 2021/0242481 A1* | 8/2021 | Kim | ..................... | H01M 8/1058 |

FOREIGN PATENT DOCUMENTS

| | | |
|---|---|---|
| JP | 2009-48953 A | 3/2009 |
| KR | 10-2020-0081030 A | 7/2020 |

* cited by examiner

*Primary Examiner* — Stewart A Fraser

(57) ABSTRACT

Disclosed is an ion conducting layer for fuel cells, through which ions generated by oxidation of liquid fuel pass before the ions reach a membrane in a fuel cell. The ion conducting layer includes: a substrate into which the liquid fuel and an electrolyte are introduced; and pores formed in the substrate, wherein the pores are formed at a porosity of 10% or more in the substrate to suppress a crossover phenomenon in which the liquid fuel passes through the membrane.

17 Claims, 15 Drawing Sheets

ION CONDUCTING LAYER FOR FUEL CELLS SUPPRESSING CROSSOVER PHENOMENON AND FUEL CELL COMPRISING THE SAME

CROSS-REFERENCE TO RELATED APPLICATION

This patent document claims priority to and the benefit of Korean Patent Application No. 10-2021-0181753, filed on Dec. 17, 2021, the entire disclosure of which is incorporated by reference for all purposes as if fully set forth herein.

FIELD

The present invention relates to an ion conducting layer for fuel cells that can suppress a crossover phenomenon and a fuel cell including the same.

BACKGROUND

Among various fuel cells, a direct liquid-fuel cell configured to directly supply liquid fuel, such as methanol, ethanol, ammonia, formic acid, and the like, is an energy conversion device that converts chemical energy into electrical energy through electrochemical reaction between a mixture of the liquid fuel and water and pure oxygen or air acting as an oxidizing agent.

Since the direct liquid-fuel cell uses a liquid fuel having a high energy density to allow easy storage and use of fuel, the fuel cell can be reduced in size.

In order to use a fuel cell for mobile devices, there is a need for miniaturization of the fuel cell through improvement in power generation performance and reduction in size of an overall fuel cell system. Accordingly, the direct liquid-fuel cell may adopt a method of reducing fuel volume using a high-concentration liquid fuel. However, conventionally, the high-concentration liquid fuel has a problem of a crossover phenomenon in which unreacted liquid fuel in an oxidation electrode reaches a reduction electrode through a polymer membrane (for example, Nafion which is a hydrogen ion-conducting polymer membrane).

Due to the crossover phenomenon of the liquid fuel, oxidation of the liquid fuel occurs simultaneously with reduction of oxygen at the reduction electrode, thereby causing deterioration in performance of the fuel cell through a mixed potential phenomenon. In addition, when methanol is used as the liquid fuel, carbon monoxide (CO), which is an intermediate product during oxidation at the reduction electrode, can be adsorbed to and can poison a surface of a catalyst layer at the reduction electrode, thereby causing deterioration in utilization of a catalyst at the reduction electrode through interference with adsorption and reduction of oxygen. Moreover, the crossover liquid fuel causes flooding together with water generated by reduction of oxygen at the reduction electrode to close pores in the catalyst layer of the reduction electrode, thereby causing deterioration in fuel cell performance through reduction in reaction area for reduction of oxygen.

Therefore, there is a need for development of a direct liquid-fuel cell that can prevent the crossover phenomenon even in use of a high-concentration liquid fuel.

SUMMARY

Embodiments of the present invention are conceived to solve such problems in the art and provide an ion conducting layer capable of suppressing a crossover phenomenon of a direct liquid-fuel cell, and a fuel cell including the same.

In accordance with one aspect of the present invention, there is provided an ion conducting layer for fuel cells, through which ions generated by oxidation of liquid fuel pass before the ions reach a membrane in a fuel cell, the ion conducting layer comprising: a substrate into which the liquid fuel and an electrolyte are introduced; and pores formed in the substrate, wherein the pores are formed at a porosity of 10% or more in the substrate to suppress a crossover phenomenon in which the liquid fuel passes through the membrane.

According to embodiments of the invention, the fuel cell can improve fuel efficiency and output density through miniaturization of the crossover phenomenon of the liquid fuel.

According to the embodiments of the invention, the fuel cell can use a high-concentration liquid fuel and thus can be easily applied to fuel cells for mobile devices by securing specific power and specific energy while reducing the volume of fuel.

According to the embodiments of the invention, the fuel cell uses green methanol produced using recovered carbon dioxide as fuel, thereby achieving sustainable energy solution technology for mobile devices.

According to the embodiments of the invention, the fuel cell can suppress the crossover phenomenon by supplying a mixture of liquid fuel and an electrolyte to a fuel electrode to improve reactivity of the liquid fuel.

According to the embodiments of the invention, the fuel cell can achieve multistage physical and/or chemical suppression of the crossover phenomenon through an ion conducting layer, thereby enabling effective suppression of the crossover phenomenon.

BRIEF DESCRIPTION OF DRAWINGS

The above and other aspects, features, and advantages of the present invention will become apparent from the detailed description of the following embodiments in conjunction with the accompanying drawings.

DETAILED DESCRIPTION

Hereinafter, embodiments of the present invention will be described with reference to the accompanying drawings. It should be understood that the present invention may be embodied in different ways and is not limited to the following embodiments, and that the following embodiments are given by way of illustration to provide a thorough understanding of the present invention to those skilled in the art Herein, when an element is referred to as being placed "on" or "under" another element, the element can be directly placed on or under the other element, or intervening element(s) may be present therebetween.

Herein, when an element is referred to as being placed at "the left" or "the right" of another element, the element can be directly placed at the left or the right of the other element, or intervening element(s) may be present therebetween.

In addition, spatially relative terms, such as "upper" and "lower", are defined with reference to the accompanying drawings. Thus, it will be understood that "upper side" can be used interchangeably with "lower side".

As used herein, a "fuel electrode" may also be referred to as an anode or an oxidation electrode.

As used herein, an "air electrode" may also be referred to as a cathode or a reduction electrode.

Hereinafter, embodiments of the present invention will be described with reference to the accompanying drawings.

Figure 1:
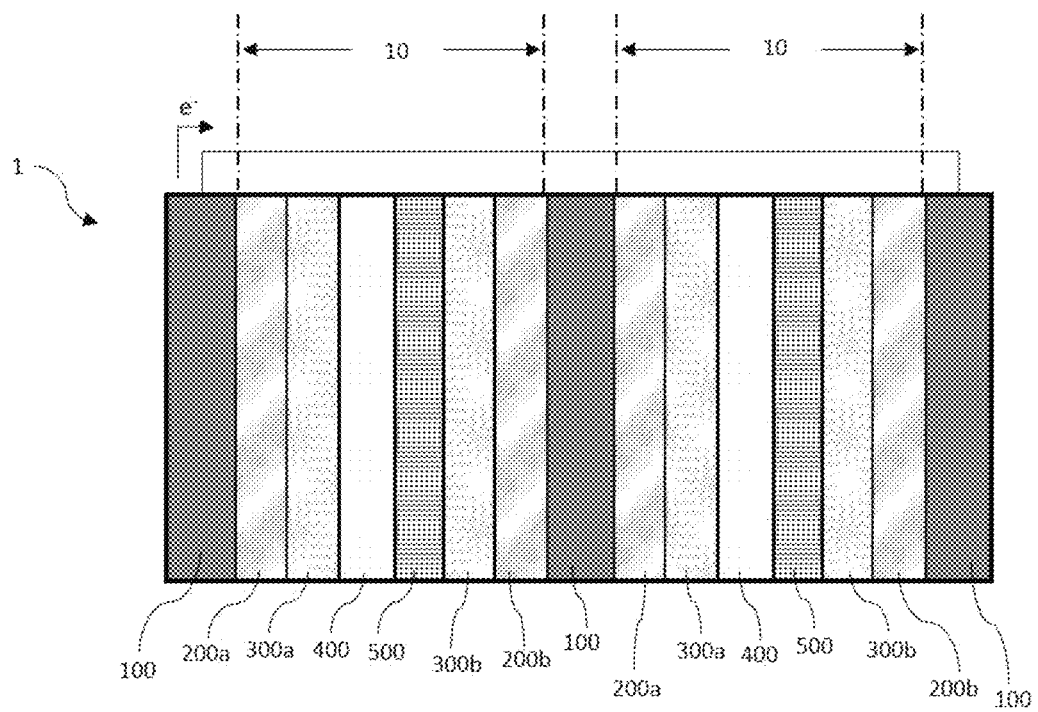
FIG. 1 is a view of a direct liquid-fuel cell stack according to one embodiment of the present invention.

FIG. 1 is a view of a direct liquid-fuel cell stack according to one embodiment of the present invention.

Referring to FIG. 1, a direct liquid-fuel cell stack 1 includes separators 100 and unit cells 10 each disposed between the separators 100.

Each of the unit cells 10 may include a fuel electrode layer 300a, an ion conducting layer 400, a membrane 500, an air electrode layer 300b, and an air electrode diffusion layer 200b, which are sequentially disposed in the stated order, and, optionally, may further include a fuel electrode diffusion layer 200a disposed opposite the ion conducting layer 400 with reference to the fuel electrode layer 300a. Although FIG. 1 shows two unit cells 10, it should be understood that the present invention is not limited thereto. The direct liquid fuel cell stack may include a single unit cell, or three or more unit cells.

For example, the separator 100 acts as an electrode that conducts electricity generated in the unit cells 10 of the direct liquid-fuel cell stack 1 to the outside and may be disposed at both ends of the unit cell 10 to separate the unit cells 10 from each other in the direct liquid-fuel cell stack 1, in which multiple unit cells 10 are successively arranged.

For example, the separator 100 may be disposed to adjoin the fuel electrode diffusion layer 200a or the fuel electrode layer 300a in the unit cell 10.

For example, the separator 100 may be disposed to adjoin the air electrode diffusion layer 200b in the unit cell 10.

For example, the separator 100 may be formed with a flow path 130 (see FIG. 2), along which a mixture of liquid fuel and an electrolyte can be consistently supplied to the fuel electrode diffusion layer 200a or the fuel electrode layer 300a adjoining the separator 100 and along which oxygen can be consistently supplied to the air electrode diffusion layer 200b adjoining the separator 100. Details of this structure will be described with reference to FIG. 2.

For example, the separator 100 may be made of a metallic material, such as iron, titanium, aluminum, and alloys thereof, a carbon material, such as graphite and a carbon plate, and a polymer material, which is imparted with conductivity using various metallic materials or carbon materials, without being limited thereto.

The fuel electrode diffusion layer 200a may act as a flow channel for the mixture of the liquid fuel and the electrolyte and may also act as an electron conductor between the separator 100 and the fuel electrode layer 300a. According to the present invention, the fuel electrode layer 300a may perform the same functions as the fuel electrode diffusion layer 200a or the fuel cell stack may optionally further include the fuel electrode diffusion layer 200a. A typical fuel electrode diffusion layer allows conduction of only electrons therethrough, whereas the fuel electrode diffusion layer 200a according to the present invention may have not only an electron-conducting function but also an ion-conducting function by adopting a structure of supplying ions through the mixture of the liquid fuel and the electrolyte, unlike the typical fuel electrode diffusion layer.

A typical electrode layer is composed of a catalyst layer, which is formed by mixing a Pt/C catalyst containing platinum (Pt—Ru) supported on graphite (C) powder with a polymer solution in which a polymer ionomer capable of conducting ions and a solvent, for example, Nafion and the like, are dissolved, followed by coating/drying the resulting mixture on a separator to form catalyst agglomerates. Such a typical electrode layer has a dense structure having a thickness of 5 μm to 80 μm and a porosity of 30% to 50%. In application of such a fuel electrode layer, a diffusion layer is necessarily disposed between the separator and the electrode layer to achieve uniform supply of a reactive material, for example, oxygen or methanol, to the overall surface of the electrode layer.

According to the present invention, the fuel electrode layer 300a may include carbon paper, carbon cloth, carbon felt, and a conductive substrate. By way of example, the fuel electrode layer may include a catalyst layer, which includes at least one selected from among platinum, Ru, graphite, and a fluorine resin on carbon paper, and contains an electrolyte solution together with liquid fuel to facilitate distribution of the liquid fuel, thereby allowing elimination of a separate fuel electrode diffusion layer 200a.

For example, the fuel electrode diffusion layer 200a may have a porous structure having a porosity of 40% or more, for example, 60% to 80%, and one surface or the entirety thereof may be subjected to water repellency treatment.

For example, the fuel electrode diffusion layer 200a may include carbon paper, carbon cloth, carbon felt, and a conductive substrate For example, the conductive substrate may include a microporous layer on one surface thereof. For example, the microporous layer may include at least one selected from the group consisting of a carbon material, a fluorine resin, a nanomaterial, and mixtures thereof, without being limited thereto.

For example, the carbon material may include at least one selected from the group consisting of graphite, carbon black, mesoporous carbon, carbon nanotubes, carbon nanofibers, and mixtures thereof, without being limited thereto. For example, the fluorine material may include at least one selected from the group consisting of polytetrafluoroethylene, polyvinylidene fluoride (PVdF), a copolymer (PVdF-HFP) of polyvinylidene fluoride and hexafluoropropylene, and mixtures thereof, without being limited thereto.

The fuel electrode diffusion layer 200a may have any suitable thickness, as needed. For example, the fuel electrode diffusion layer 200a may have a thickness of 100 μm to 1,000 μm, without being limited thereto. If the thickness of the fuel electrode diffusion layer 200a is less than 100 μm, there can be problems in treatment and performance due to low strength thereof, and if the thickness thereof is greater than 1.000 μm, there can be a problem of difficulty in movement of a reactant, that is, liquid fuel, and a reaction gas product and in thickness reduction of the fuel cell. For example, the fuel electrode diffusion layer 200a may have a thickness of 100 μm to 400 μm to allow uniform dispersion of the reactant and the reaction gas product through easy penetration of the reactant and the reaction gas product, for example, methanol or carbon dioxide, therethrough.

In the fuel electrode layer 300*a*, ions are generated through oxidation of the liquid fuel, which is supplied directly from the separator 100 or through the fuel electrode diffusion layer 200*a*, with a catalyst.

For example, the fuel electrode layer 300*a* may include carbon paper, carbon cloth, carbon felt, and a conductive substrate. By way of example, the fuel electrode layer 300*a* may include a catalyst layer, which includes at least one selected from among platinum, Ru, graphite, and a fluorine resin, on carbon paper.

For example, the conductive substrate may include a microporous layer on one surface thereof. For example, the microporous layer may include at least one selected from the group consisting of a carbon material, a fluorine resin, a nanomaterial, and mixtures thereof, without being limited thereto.

For example, the carbon material may include at least one selected from the group consisting of graphite, carbon black, mesoporous carbon, carbon nanotubes, carbon nanofibers, and mixtures thereof, without being limited thereto. For example, the fluorine material may include at least one selected from the group consisting of polytetrafluoroethylene, polyvinylidene fluoride (PVdF), a copolymer (PVdF-HFP) of polyvinylidene fluoride and hexafluoropropylene, and mixtures thereof, without being limited thereto.

For example, the catalyst distributed in the fuel electrode layer 300*a* may include a catalyst formed by securing a platinum-based catalyst. The platinum-based catalyst may include platinum oxide, a complex oxide of platinum oxide and an oxide of a metal element other than platinum, platinum obtained through reduction of the platinum oxide or the complex oxide, a platinum-containing multi-component metal, a mixture of platinum and an oxide of a metal element other than platinum, a mixture of a platinum-containing multi-component metal and an oxide of a metal element other than platinum, and combinations thereof, without being limited thereto. The metal element other than platinum may include at least one selected from the group consisting of Al, Si, Ti, V, Cr, Fe, Co, Ni, Cu, Zn, Ge, Zr, Nb, Mo, Ru, Rh, Pd, Ag, In, Sn, Hf, Ta, W, Os, Ir, Au, La, Ce, and Nd, without being limited thereto.

For example, the fuel electrode layer 300*a* may be composed of a single layer or two or more layers. By way of example, two or more layers can enhance oxidation efficiency through distribution of different kinds of catalysts.

The fuel electrode layer 300*a* may have a thickness of 100 µm to 600 µm, for example, 100 µm to 300 µm, a porosity of 50% or more, and a pore diameter of 1 µm to 200 µm.

For example, for the fuel electrode layer 300*a* including multiple catalyst layers, each of the catalyst layers may have a thickness of 5 µm to 300 µm, without being limited thereto. If the thickness of the catalyst layer is less than 5 µm, it can be difficult to obtain high output due to a small amount of the catalyst, and if the thickness of the catalyst layer is greater than 300 µm, there can be a problem of deterioration in output caused by substance conduction resistance due to inefficient discharge of a reaction gas product and inefficient fuel supply.

When a typical fuel electrode layer is composed of two or more layers, there can be a problem in ion conduction due to increase in interlayer distance, and even in the case where the typical fuel electrode layer is composed of a single layer, the fuel electrode layer having a large thickness can provide a problem in ion conduction. On the contrary, the fuel electrode layer 300*a* according to the present invention contains the electrolyte solution capable of conducting ions together with the liquid fuel, the fuel electrode layer can maintain high efficiency in ion conduction even when the thickness or interlayer distance of the fuel electrode layer is increased.

The ion conducting layer 400 is disposed between the fuel electrode layer 300*a* and the membrane 500 and serves to transfer ions, which have been introduced into the ion conducting layer 400 from the fuel electrode layer 300*a*, to the membrane 500 while preventing the liquid fuel, which has been introduced into the ion conducting layer 400 from fuel electrode layer 300*a*, from being transferred to the membrane 500.

The ion conducting layer 400 may have a porous structure having a porosity of 10% or more to allow liquid flow therein and may include a conductive substrate selected from the group consisting of carbon fiber fabrics, carbon fiber non-woven fabrics, carbon paper, carbon fiber mesh, synthetic fiber mesh coated with a conductive material, and polymer fiber fabrics coated with a conductive material, without being limited thereto.

For example, the ion conducting layer 400 may have a structure having a porosity of 10% to 90% and a pore diameter of 1 µm to 200 µm. Within these ranges, the ion conducting layer 400 according to the present invention can achieve physical reduction of the crossover phenomenon and additional reduction in crossover phenomenon by the catalyst 420 described below by allowing effective oxidation of the liquid fuel in the mixture of the liquid fuel and the electrolyte while allowing the catalyst to easily pass therethrough.

For example, the ion conducting layer 400 has a multilayer structure, in which each layer has a different pore structure and/or a different catalyst distribution, to suppress flow of the liquid fuel to the membrane 500, thereby achieving effective suppression of the crossover phenomenon in which the liquid fuel flows to the cathode.

For example, when the ion conducting layer 400 does not contain a catalyst described below, the ion conducting layer 400 may include a non-conductive porous material, for example, a porous plastic material. As a result, even with a simple structure, the ion conducting layer 400 can maintain ion conduction efficiency.

The ion conducting layer 400 may include a catalyst formed by securing a platinum-based catalyst, for example, a catalyst formed by securing a platinum-based catalyst, which is applied to the fuel electrode layer 300*a*. The platinum-based catalyst may include at least one selected from the group consisting of platinum oxide, a complex oxide of platinum oxide and an oxide of a metal element other than platinum, platinum obtained through reduction of the platinum oxide or the complex oxide, a platinum-containing multi-component metal, a mixture of platinum and an oxide of a metal element other than platinum, and a mixture of a platinum-containing multi-component metal and an oxide of a metal element other than platinum, and combinations thereof, without being limited thereto. The metal element other than platinum may include at least one selected from the group consisting of Al, Si, Ti, V, Cr, Fe, Co, Ni, Cu, Zn, Ge, Zr, Nb, Mo, Ru, Rh, Pd, Ag. In, Sn, Hf, Ta, W, Os, Ir, Au, La, Ce, and Nd, without being limited thereto. The catalyst may be evenly distributed inside the ion conducting layer 400 and may form a multilayer structure in which the amount of the catalyst varies to change efficiency in reaction between the liquid fuel and the catalyst, thereby suppressing the crossover phenomenon in which the liquid fuel flows to the cathode.

For example, when the ion conducting layer 400 contains an electrolyte, an electron-conductive material may be applied to the ion conducting layer 400 in order to activate catalytic reaction through migration of electrons to the fuel electrode layer 300a and the separator 100 through the ion conducting layer 400.

For example, the ion conducting layer 400 contains the electrolyte to improve efficiency in ion conduction. By way of example, the electrolyte may include sulfuric acid, phosphoric acid, nitric acid, hydrochloric acid, carbonic acid, acetic acid, citric acid, oxalic acid, and the like. In this way, according to the present invention, the mixture of the electrolyte and the liquid fuel is supplied to the ion conducting layer 400 through the fuel electrode layer 300a, whereby the ion conducting layer 400 can perform an ion conducting function, that is, a function of conducting ions generated in the fuel electrode layer 300a to the membrane 500 through the ion conducting layer 400. For example, the electrolyte in the fuel electrode layer 300a may be the same as the electrolyte in the ion conducting layer 400.

For example, the ion conducting layer 400 may have a thickness of 10 μm to 400 μm, without being limited thereto. If the thickness of the ion conducting layer 400 is less than 10 μm, the effect of preventing the liquid fuel from being transferred to the membrane 500 can be deteriorated, and if the thickness of the ion conducting layer 400 is greater than 400 μm, the ion conducting layer 400 can suffer from difficulty in migration of ions therethrough and can make it difficult to form a compact fuel cell.

The membrane 500 may be disposed between the air electrode layer 300b and the ion conducting layer 400 such that ions having passed through the ion conducting layer 400 migrate to the air electrode 300b through the membrane 500.

For example, the membrane 500 may include a polymer resin having a cation exchange group selected from the group consisting of a sulfonic acid group, a carboxylic acid group, a phosphoric acid group, a phosphonic acid group, and derivatives thereof, without being limited thereto. The polymer resin may include at least one selected from among, for example, a fluorine based polymer, a benzimidazole based polymer, a polyimide based polymer, a polyetherimide based polymer, a polyphenylene sulfide based polymer, a polysulfone based polymer, a polyether sulfone based polymer, a polyether ketone based polymer, a polyetherether ketone based polymer, and a polyphenylquinoxaline based polymer. By way of example, the polymer resin may include at least one selected from among poly (perfluorosulfonic acid), poly (perfluorocarboxylic acid), a copolymer of tetrafluoroethylene and fluorovinylether containing a sulfonic acid group, defluorinated polyether ketone sulfide, aryl ketone, poly(2,2'-(m-phenylene)-5,5'-bibenzimidazole, and poly(2,5-benzimidazole).

The membrane 500 may be manufactured using the material described above or may be obtained from commercially available products. As a commercially available membrane 500, a perfluorosulfonate ionomer membrane, such as Nafion™ (DuPont), Flemion™ (Asahi Glass) and Aciplex™ (Asahi-kasei) electrolyte membranes, is generally used.

In addition, a complex polymer electrolyte membrane formed by coating the surface of an ion conductive polymer with nano-metal may be used as the membrane 500 to suppress deterioration in performance of the fuel cell due to lack of moisture by improving moisture retention capability in the membrane while suppressing the crossover phenomenon due to use of the liquid fuel, such as methanol or ethanol.

Stability of the nano-metal coating layer on the membrane 500 can be improved by forming a polymer coating layer on the nano-metal coating layer. The polymer coating layer may be formed of an ion-conductive polymer material.

The air electrode diffusion layer 200b may act as a migration path of oxygen supplied from the separator 100 and may also as an electron conductor disposed between the separator 100 and the air electrode layer 300b. The air electrode diffusion layer 200b according to the present invention allows conduction of only electrons therethrough, unlike the fuel electrode diffusion layer 200a.

The structure, material, and thickness of the air electrode diffusion layer 200b and the presence of the catalyst therein may be set as described in the fuel electrode diffusion layer 200a.

In the air electrode layer 300b, reduction of oxygen supplied from the air electrode diffusion layer 200b is performed by hydrogen ions and the catalyst.

The air electrode layer 300b is composed of a catalyst layer, which is formed by mixing a Pt/C catalyst containing platinum (Pt—Ru) supported on graphite (C) powder with a polymer solution in which a polymer ionomer capable of conducting ions and a solvent, for example, Nafion, are dissolved, followed by coating/drying the resulting mixture on the separator to form catalyst agglomerates, and may have a dense structure having a thickness of 5 μm to 80 μm and a porosity of 30% to 50%.

For example, since the air electrode layer 300b does not allow easy conduction of ions therethrough due to the absence of an electrolyte solution therein, the air electrode layer may have the above structure instead of the structure of the fuel electrode layer according to the present invention.

Figure 2:
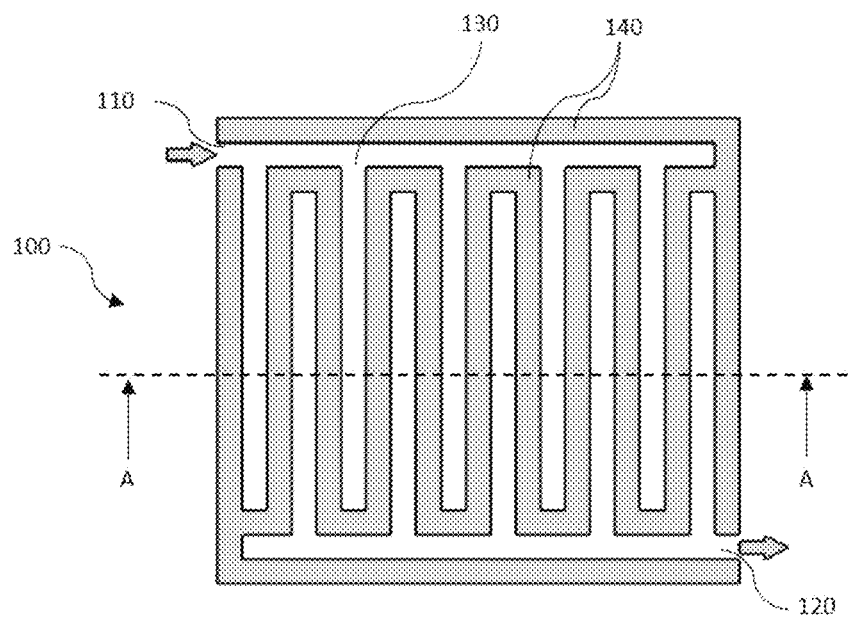
FIG. 2 is a view of a separator according to one embodiment of the present invention.

FIG. 2 is a view of a separator according to one embodiment of the present invention.

Referring to FIG. 2, the separator 100 may include an inlet 110 and an outlet 120, which are open to the outside, a flow path 130 connected to the inlet 110 and/or the outlet 120, and a partition wall 150 dividing the flow path 130 into plural flow paths.

For example, the flow path 130 may have a channel shape and may include at least one type selected from among a serpentine type, a parallel type, a mesh type, and an interdigitated type so as to allow the liquid fuel to be supplied through diffusion or convection, without being limited thereto.

For example, reaction products, for example, carbon dioxide and water, and a solution remaining after use of the liquid fuel may be discharged from the direct liquid-fuel cell stack 1 through the flow path 130. On the other hand, the mixture of the liquid fuel and the electrolyte may contain a fuel diluted in water, for example, an ionically conductive methanol solution diluted in water, and the remaining solution used in oxidation may be discharged through the flow path to be recirculated after adjustment in concentration and acidity of the solution.

The mixture of the liquid fuel and the electrolyte may be introduced into the flow path 130 through the inlet 110, and a non-reacted solution and electrolyte of the liquid fuel may be discharged therefrom through the outlet 120. Here, the solution and the electrolyte discharged through the outlet 120 may be circulated and introduced again into the flow path through the inlet 110 after adjustment in the content of the liquid fuel and the content of the electrolyte.

The flow path 130 may be evenly formed over the entire area of the separator 100 and may be designed to allow the mixture of the liquid fuel and the electrolyte flowing through the flow path 130 to be evenly supplied from the overall surface of the separator 100 to the fuel electrode diffusion layer 200a and/or the air electrode diffusion layer 200b, as shown in FIG. 1, and this structure will be described with reference to the accompanying drawings.

Figure 3A:
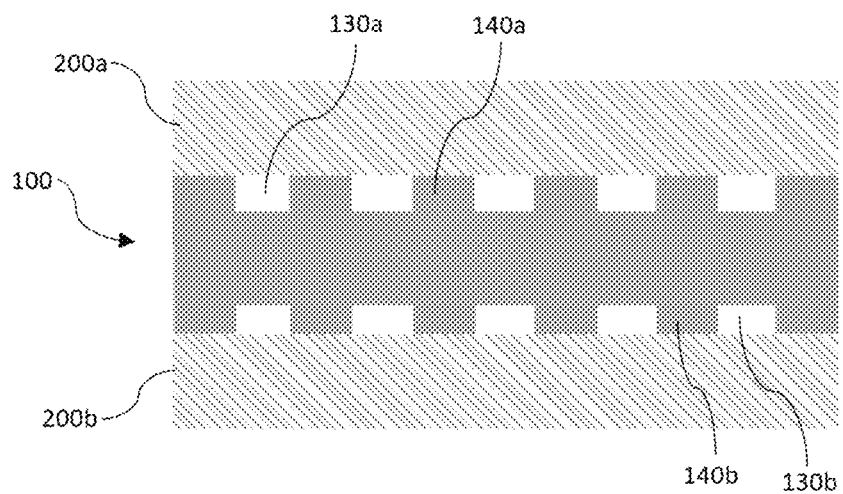
FIG. 3A, FIG. 3B and FIG. 3C are cross-sectional views taken along line A-A of FIG. 2.
Figure 3B:
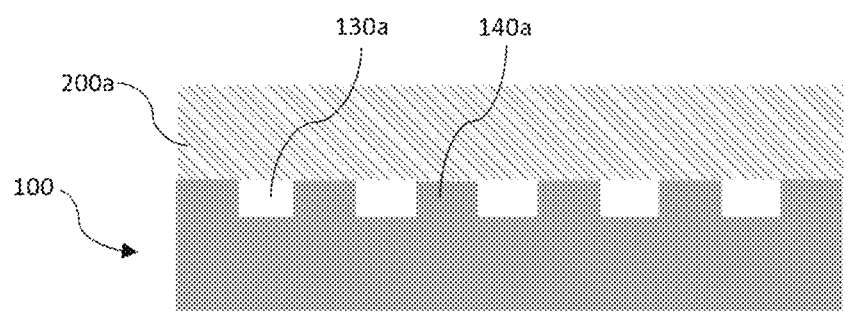
Figure 3C:
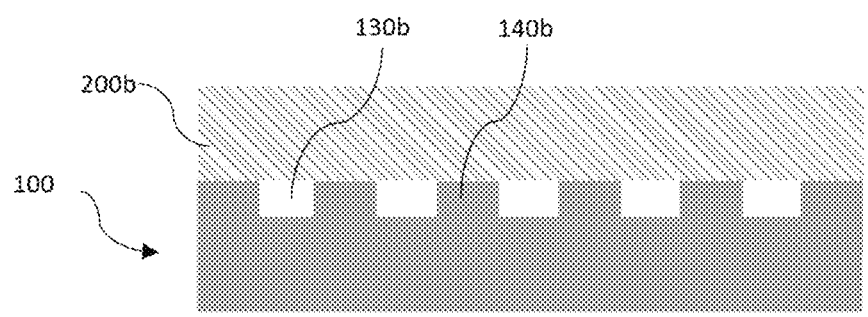

FIG. 3A, FIG. 3B and FIG. 3C are cross-sectional views taken along line A-A of FIG. 2.

Referring to FIG. 3A, the separator 100 may have one surface adjoining the fuel electrode diffusion layer 200a and the other surface adjoining the air electrode diffusion layer 200b, and may be disposed between the unit cells 10 in the direct liquid-fuel cell stack 1.

Flow paths 130a, 130b and partition walls 140a, 140b may be disposed in a convex-concave shape at upper and lower portions of the separator 100, in which the flow path 130a may be formed between the partition walls 140a attached to the fuel electrode diffusion layer 200a and the flow path 130b may be formed between the partition walls 140b attached to the air electrode diffusion layer 200b.

The mixture of the liquid fuel and the electrolyte may be introduced into the flow path 130a formed in the separator 100 attached to the fuel electrode diffusion layer 200a and oxygen may be introduced into the flow path 130b formed in the separator 100 attached to the air electrode diffusion layer 200b.

Referring to FIG. 3B and FIG. 3C, one surface of the separator 100 may adjoin the fuel electrode diffusion layer 200a or the air electrode diffusion layer 200b, and the separator 100 shown in FIG. 3B and FIG. 3C may be applied to each of the unit cells 10 disposed at distal ends of the direct liquid-fuel cell stack 1.

Referring to FIG. 3B and FIG. 3C, the separator 100 may have a structure in which the flow paths 130a, 130b and the partition walls 140a, 140b are not formed on the other surface thereof.

Figure 4A:
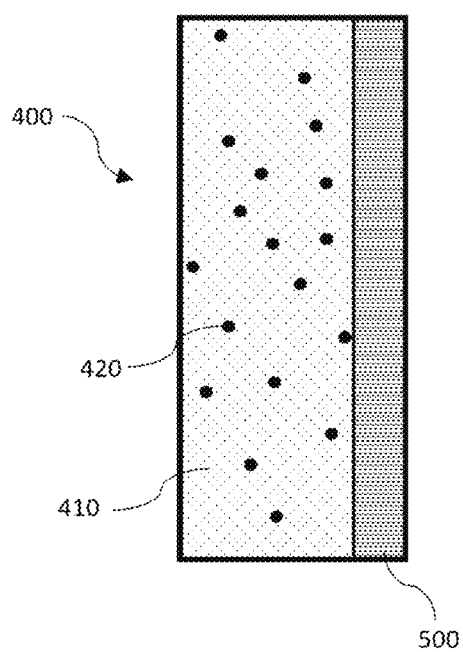
FIG. 4A, FIG. 4B and FIG. 4C are views of ion conducting layers according to embodiments of the present invention.
Figure 4B:
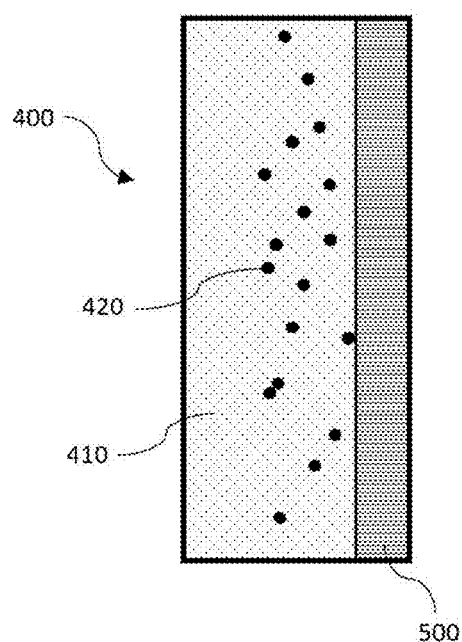
Figure 4C:
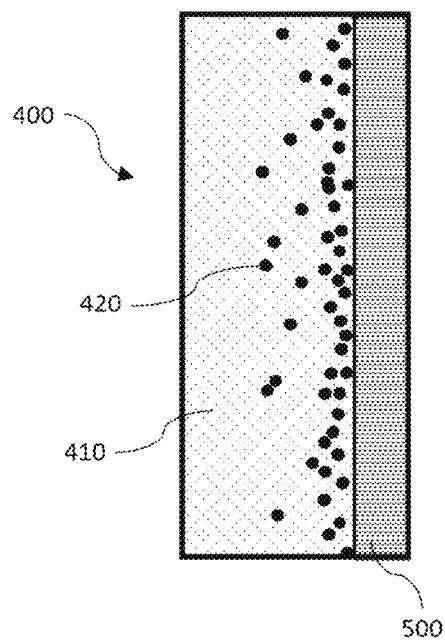
Figure 5A:
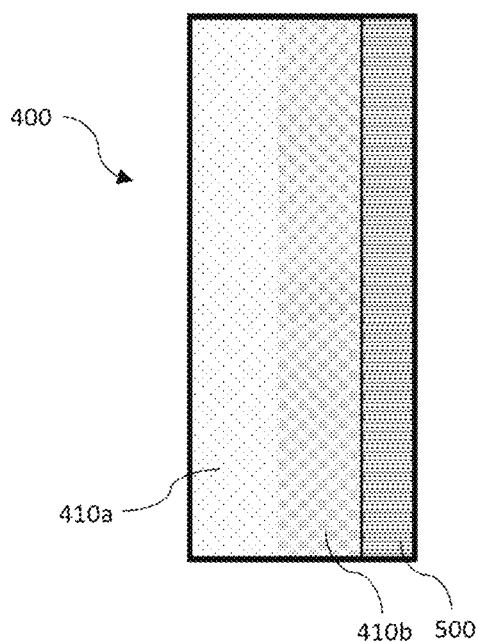
FIG. 5A, FIG. 5B and FIG. 5C are views of ion conducting layers according to embodiments of the present invention.
Figure 5B:
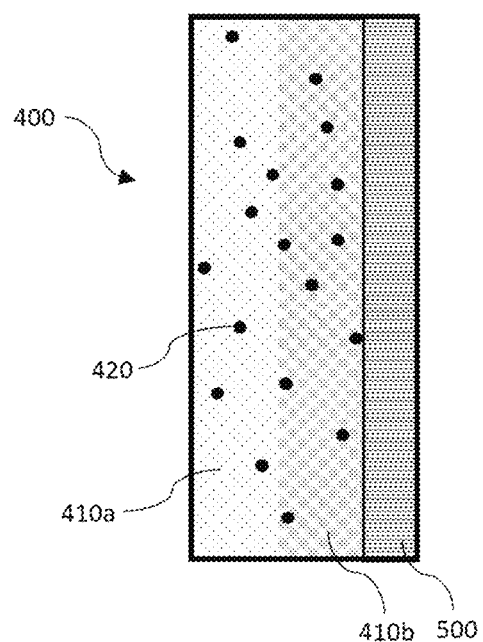
Figure 5C:
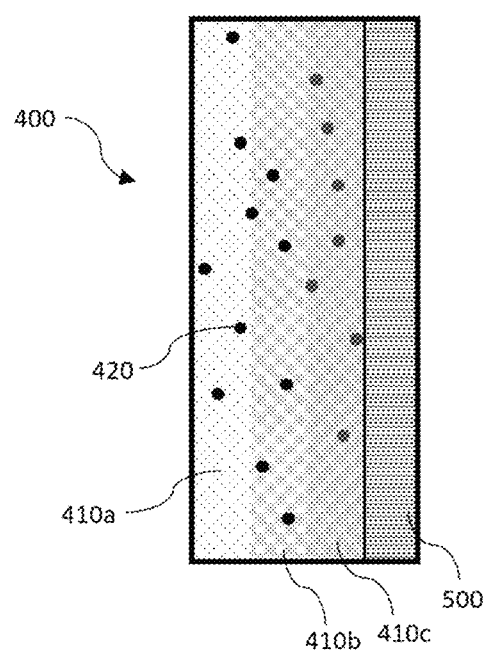
Figure 6A:
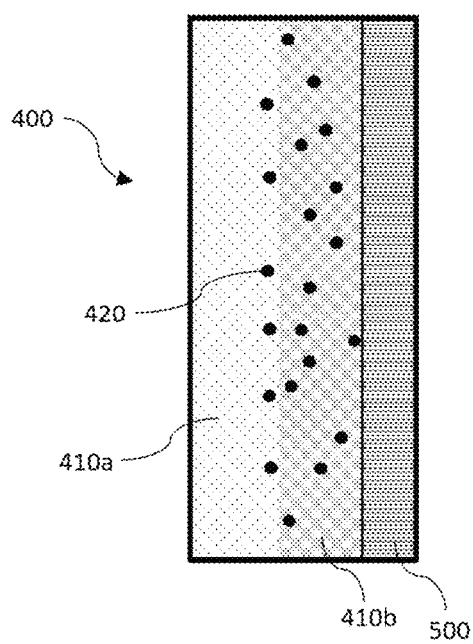
FIG. 6A and FIG. 6B are views of ion conducting layers according to embodiments of the present invention.
Figure 6B:
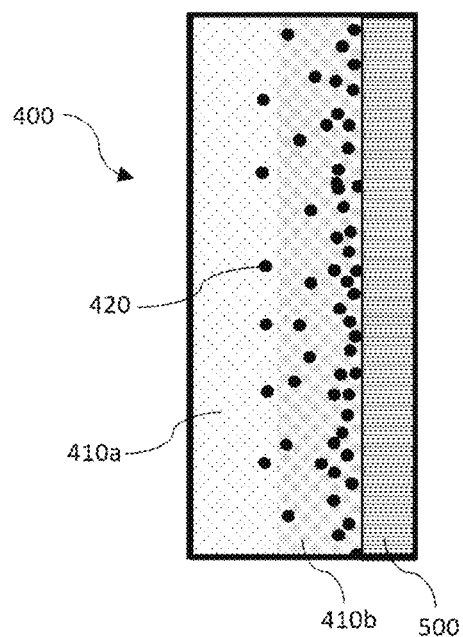
Figure 7A:
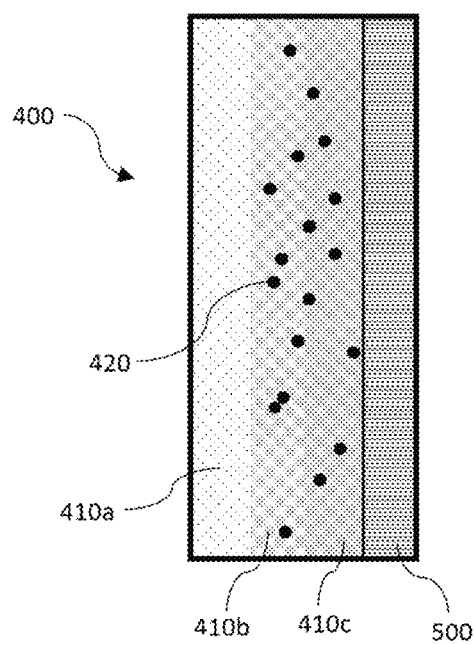
FIG. 7A and FIG. 7B are views of ion conducting layers according to embodiments of the present invention.
Figure 7B:
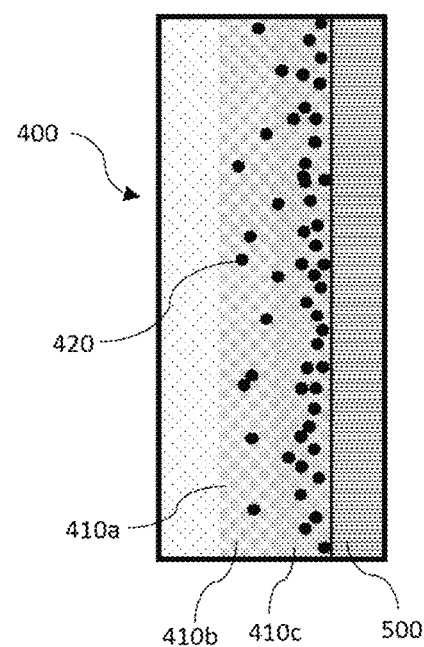

FIG. 4A, FIG. 4B and FIG. 4C are views of ion conducting layers according to embodiments of the present invention; FIG. 5A, FIG. 5B and FIG. 5C are views of ion conducting layers according to embodiments of the present invention; FIG. 6A and FIG. 6B are views of ion conducting layers according to embodiments of the present invention; and FIG. 7A and FIG. 7B are views of ion conducting layers according to embodiments of the present invention.

The ion conducting layer 400 receives ions generated by oxidation of the liquid fuel in the fuel cell before the ions reaches the membrane, and includes a substrate 410, into which the liquid fuel and the electrolyte are introduced, and pores formed in the substrate 410. Although not shown in the drawings, the pores may be formed to pass through the substrate 410 by any method known to those skilled in the art.

Referring to FIG. 4A, the ion conducting layer 400 may include a porous substrate 410 having a porosity of 10% or more to allow liquid flow therethrough. For example, the porous substrate 410 may have a density of 0.2 g/cm$^3$ to 1.5 g/cm$^3$. By way of example, the catalyst 420 may be evenly distributed in the ion conducting layer 400.

For example, the pores may be formed at a porosity of 10% to 90% to allow effective oxidation of the liquid fuel in the mixture of the liquid fuel and the electrolyte while allowing the catalyst to easily pass therethrough. By way of example, the size of the pores formed in the ion conducting layer 400 may have a difference of 10% or less from the size of the pores formed in the fuel electrode layer 300a.

The porous substrate 410 may be embedded in the electrolyte to secure mobility of ions and the electrolyte may be mixed with the liquid fuel to be consistently supplied to the ion conducting layer 400 through the separator 100 described with reference to FIG. 1.

For example, the substrate 410 may have a thickness of 10 μm to 400 μm, for example, 100 μm to 300 μm, to achieve stable support with respect to the membrane and the fuel electrode layer therebetween while allowing easy flow of the mixture therethrough.

The catalyst 420 may be evenly distributed in the ion conducting layer 400 and may allow additional oxidation of the liquid fuel introduced into the ion conducting layer 400 through decomposition of the liquid fuel before the liquid fuel reaches the membrane, whereby the amount of the liquid fuel flowing to the membrane 500 described with reference to FIG. 1 can be reduced, thereby additionally suppressing the crossover phenomenon in which the liquid fuel flows to the air electrode. That is, the ion conducting layer 400 according to the present invention can suppress the crossover phenomenon through reduction in concentration of the liquid fuel, such as methanol and the like, which is supplied to the membrane 500 through diffusion even without the catalyst 420, by increasing a physical distance between the membrane 500 and the fuel electrode layer 300a and/or the fuel electrode diffusion layer 200a, and can further suppress the crossover phenomenon when the catalyst 420 is further added thereto.

Referring to FIG. 4B and FIG. 4C, the catalyst 420 is present in a high amount in a region of the ion conducting layer 400 near the membrane 500, thereby effectively suppressing the crossover phenomenon in which the liquid fuel passes through the separator 500.

Referring to FIG. 4B, when the liquid fuel first introduced into the ion conducting layer 400 approaches the membrane 500 after reduction in mobility of the liquid fuel by the pores, reactivity of the liquid fuel by the catalyst 420 is increased, thereby effectively suppressing the crossover phenomenon of the liquid fuel.

Referring to FIG. 4C, the ion conducting layer 400 has a structure in which the content of the catalyst 420 gradually increases as the liquid fuel first introduced into the ion conducting layer 400 approaches the membrane 500 after reduction in mobility of the liquid fuel by the pores, thereby effectively preventing the crossover phenomenon.

Referring to FIG. 5 to FIG. 7, the ion conducting layer 400 may include multiple substrates.

The multiple substrates may include pores having the same shape. Alternatively, the pores may be formed in the multiple substrates to have a gradually decreasing size with decreasing distance to the membrane 500. The multiple substrates may be formed of different materials. The catalyst may be evenly distributed in the multiple substrates. Alternatively, the content of the catalyst may gradually increase with decreasing distance to the membrane 500. Alternatively, the sizes of the pores and the content of the catalyst 420 may be comprehensively set. Alternatively, among the multiple substrates, at least two substrates may be different from each other in terms of at least one of porosity, pore size and material. By way of example, the substrate may include a single layer or at least two layers. Accordingly, even when a high-concentration liquid fuel is used, the fuel cell stack according to the present invention can effectively suppress the crossover phenomenon by maximizing reactivity of the liquid fuel immediately before the liquid fuel reaches the membrane 500.

Referring to FIG. 5A, the ion conducting layer 400 may include a first substrate 410a and a second substrate 410b, in which the porosity and/or the pore size of the second substrate 410b closer to the membrane 500 is smaller than the porosity and/or the pore size of the second substrate 410a farther from the membrane 500, thereby enabling multistage physical suppression of the crossover phenomenon in which the liquid fuel passes through the membrane 500. Specifically, the moving speed and the moving amount of the liquid fuel may be primarily reduced in the first substrate 410a and then may be secondarily reduced in the second substrate 410b, thereby enabling multistage physical suppression of the crossover phenomenon.

On the other hand, although FIG. 5A shows the ion conducting layer 400 including two substrates, the ion conducting layer 400 may include three or more substrates. In this case, as the substrate is placed closer to the membrane 500, the porosity and/or the pore size of the substrate may become smaller than the porosity and/or the pore size of the fuel electrode layer 300a.

By way of example, when the ion conducting layer 400 includes n substrates, the porosity and/or the pore sizes of the substrates may be set according to a relation of "$(n-2)^{th}$ substrate $\geq (n-1)^{th}$ substrate $> n^{th}$ substrate" or a relation of "$(n-2)^{th}$ substrate $> (n-1)^{th}$ substrate $\geq n^{th}$ substrate".

Referring to FIG. 5B, the ion conducting layer 400 including the catalysts 420 evenly distributed therein includes a first substrate 410a and a second substrate 410b, in which the porosity and/or the pore size of the second substrate 410b closer to the membrane 500 is smaller than the porosity and/or the pore size of the second substrate 410a farther from the membrane 500, thereby enabling chemical suppression of the crossover phenomenon by the catalyst 420 while enabling multistage physical suppression of the crossover phenomenon, in which the liquid fuel passes through the membrane 500.

Referring to FIG. 5C, the ion conducting layer 400 including the catalysts 420 evenly distributed therein includes a first substrate 410a, a second substrate 410b, and a third substrate 410c, in which the porosity and/or the pore size of the substrate disposed closer to the membrane 500 is smaller than the porosity and/or the pore size of the substrate disposed farther from the membrane 500, thereby enabling multistage physical suppression of the crossover phenomenon, in which the liquid fuel passes through the membrane 500. For example, the porosity and/or the pore sizes of the substrates may be set according to a relation of "first substrate 410a≥second substrate 410b>third substrate 410c" or a relation of "first substrate 410a>second substrate 410b>third substrate 410c".

Referring to FIG. 6A and FIG. 6B, the ion conducting layer 400 does not include the catalyst 420 in a region separated from the membrane 500 by a predetermined distance or more and includes the catalyst 420 in a region separated from the membrane 500 by a predetermined distance or less. In addition, the ion conducting layer 400 includes a first substrate 410a and a second substrate 410b, in which the porosity and/or the pore size of the second substrate 410b closer to the membrane 500 is smaller than the porosity and/or the pore size of the second substrate 410a farther from the membrane 500. Further, the ion conducting layer 400 includes the catalyst 420 such that the content of the catalyst 420 is high in a region near the membrane 500.

Referring to FIG. 6A, when the liquid fuel first introduced into the ion conducting layer 400 reaches the second substrate 410b, which is formed with pores in a smaller porosity and/or in a smaller pore size than the porosity and/or the pore size of the first substrate 410a, after reduction in mobility of the liquid fuel by the pores formed in the first substrate 410a, reactivity of the liquid fuel by the catalyst 420 is increased, thereby effectively preventing the crossover phenomenon with a small amount of the catalyst 420.

Referring to FIG. 6B, the ion conducting layer 400 has a structure in which the content of the catalyst 420 gradually increases as the liquid fuel first introduced into the ion conducting layer 400 approaches the second substrate 410b, which is formed with the pores in a smaller porosity and/or in a smaller pore size than the porosity and/or the pore size of the first substrate 410a, after reduction in mobility of the liquid fuel by the pores formed in the first substrate 410a, thereby effectively preventing the crossover phenomenon.

Accordingly, it is possible to achieve effective chemical suppression of the crossover phenomenon with a small amount of the catalyst 420, while enabling multistage physical suppression of the crossover phenomenon, in which the liquid fuel passes through the membrane 500.

Referring to FIG. 7A and FIG. 7B, the ion conducting layer 400 including the catalysts 420 includes a first substrate 410a, a second substrate 410b, and a third substrate 410c, in which the porosity and/or the pore size of the substrate gradually decreases with decreasing distance to the membrane 500, thereby enabling multistage physical suppression of the crossover phenomenon, in which the liquid fuel passes through the membrane 500. For example, the porosity and/or the pore sizes of the substrates may be set according to a relation of "first substrate 410a≥second substrate 410b>third substrate 410c" or a relation of "first substrate 410a>second substrate 410b≥third substrate 410c". At the same time, the catalyst may be not present in the first substrate 410 into which the liquid fuel is first introduced, and may be present in the second substrate 410b and the third substrate 410c, thereby enabling multistage chemical suppression of the crossover phenomenon. For example, when the substrates are disposed to have the content of the catalyst 420 gradually increasing with decreasing distance to the membrane 500, as shown in FIG. 7B, it is possible to achieve multistage chemical suppression of the crossover phenomenon.

As such, the fuel cell stack according to the present invention may have a structure capable of achieving multistage physical suppression of the crossover phenomenon, a structure capable of achieving multistage chemical suppression of the crossover phenomenon, or a structure capable of achieving multistage physical/chemical suppression of the crossover phenomenon, through application of the ion conducting layer 400.

The present invention provides an ion conductive assembly for fuel cells, which includes the ion conducting layer and the fuel electrode layer.

In addition, the present invention provides a unit cell for fuel cells, which includes the ion conductive assembly for fuel cells, the aforementioned air electrode layer disposed opposite the ion conducting layer with reference to the membrane and allowing reaction between oxygen and ions, which are generated by oxidation and reach the air electrode layer after passing through the membrane, and an air electrode diffusion layer for supplying oxygen to the air electrode layer.

Here, the unit cell for fuel cells may further include the aforementioned fuel electrode diffusion layer for supplying the liquid fuel to the fuel electrode layer.

Further, the present invention provides a stack for fuel cells, which includes the unit cell for fuel cells and the aforementioned separator disposed at both ends of the unit cell and supplying electricity generated in the unit cell to the outside. Here, the separator is formed with a flow path, along which the liquid fuel and the electrolyte are supplied to the fuel electrode layer.

Further, the present invention provides a fuel cell that includes a stack for fuel cells including the unit cells and a separator separating the unit cells from each other, a fuel pump for supplying liquid fuel to the stack, and an air pump for supplying oxygen to the stack.

Figure 8:
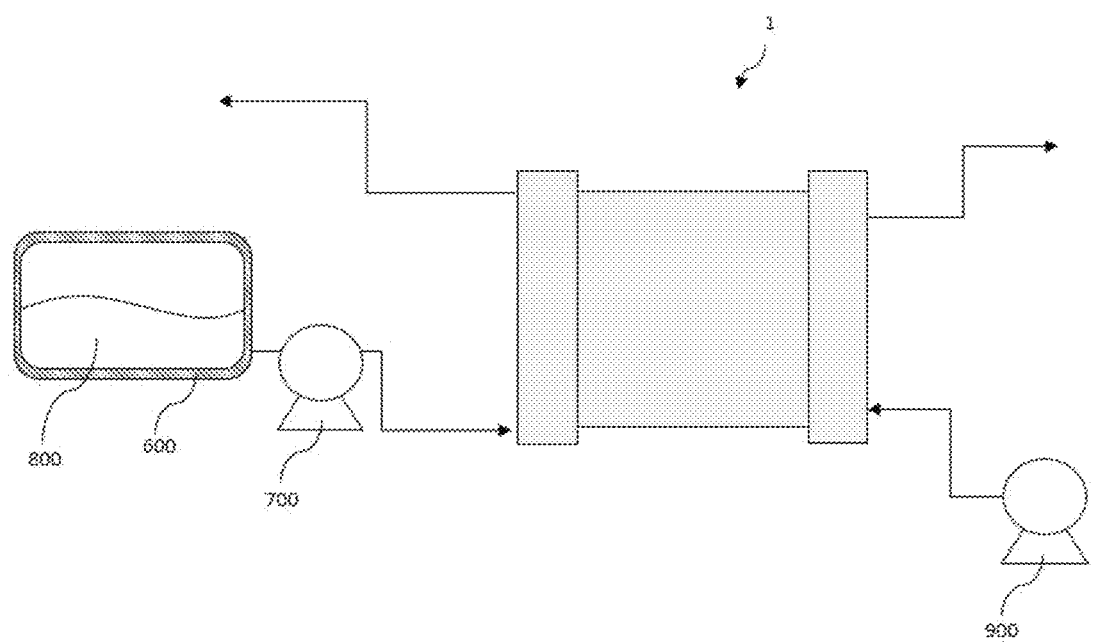
FIG. 8 is a view of a direct liquid-fuel cell system according to one embodiment of the present invention.

FIG. 8 is a view of a direct liquid-fuel cell system according to one embodiment of the present invention.

Referring to FIG. 8, the direct liquid-fuel cell system may include a fuel pump 700, which supplies liquid fuel 800 to the direct liquid-fuel cell stack 1, an air pump 900, which supplies air, and a fuel tank 600, which stores fuel.

The fuel tank 600 may store the liquid fuel 800 to be used in the direct liquid fuel cell. The liquid fuel 800 stored in the fuel tank 600 may include a mixture of water and an electrolyte, such as methanol, ethanol, propanol, butanol, ammonia, formic acid, and the like.

The liquid fuel 800 stored in the fuel tank 600 may be supplied to the direct liquid-fuel cell by the fuel pump 700 and the air pump 900 may supply air, which contains oxygen as an oxidizing agent, to the direct liquid-fuel cell.

Although some embodiments have been described herein with reference to the accompanying drawings, it should be understood that these embodiments are given by way of illustration only and the present invention is not limited thereto. The scope of the present invention should be limited only by the accompanying claims and equivalents thereto.

For example, the drawings schematically show each component to aid in understanding by those skilled in the art, and the thickness, length, number, and the like of each component shown in the drawings may differ from actual ones in the course of drawing creation. In addition, it should be understood that the material, shape and dimensions of each component in the embodiments are provided by way of illustration only and that various modifications, variations and alterations can be made by those skilled in the art without departing from the spirit and scope of the present invention.

<List of Reference Numerals>

| | |
|---|---|
| 1: Direct liquid-fuel cell stack | 10: Unit cell |
| 100: Separator | 110: Inlet |
| 120: Outlet | 130, 130a, 130b: Flow path |
| 140, 140a, 140b: Partition wall | 200a: Fuel electrode diffusion layer |
| 200b: Air electrode diffusion layer | 300a: Fuel electrode layer |
| 300b: Air electrode layer | 400: Ion conducting layer |
| 410: Substrate | 410a: First substrate |
| 410b: Second substrate | 410c: Third substrate |
| 420: Catalyst | 500: Membrane |
| 600: Fuel tank | 700: Fuel pump |
| 800: Liquid fuel | 900: Air pump |

The invention claimed is:

1. An ion conducting layer for fuel cells, through which ions generated by oxidation of liquid fuel pass before the ions reach a membrane in a fuel cell, the ion conducting layer comprising:
   a substrate into which the liquid fuel and an electrolyte are introduced; and
   pores formed in the substrate,
   wherein the ion conducting layer is disposed between a fuel electrode layer and the membrane,
   wherein the pores are formed at a porosity of 10% or more in the substrate to suppress a crossover phenomenon in which the liquid fuel passes through the membrane, and
   wherein the ion conducting layer is coupled to the fuel electrode layer and configured to receive a mixture of the liquid fuel and the electrolyte from the fuel electrode layer so as to embed the substrate of the ion conducting layer in the electrolyte to secure mobility of ions.

2. The ion conducting layer for fuel cells according to claim 1, wherein the pores are formed at a porosity of 10% to 90% and have a pore diameter of 1 μm to 200 μm to allow effective oxidation of the liquid fuel in the mixture of the liquid fuel and the electrolyte while allowing the electrolyte to easily pass therethrough.

3. The ion conducting layer for fuel cells according to claim 2, wherein the substrate has a thickness of 10 μm to 400 μm to achieve stable support with respect to the membrane and the fuel electrode layer therebetween while allowing easy flow of the mixture therethrough.

4. The ion conducting layer for fuel cells according to claim 1, wherein the substrate further comprises a catalyst distributed in the pores to suppress the crossover phenomenon in which the liquid fuel passes through the membrane by promoting additional oxidation of the liquid fuel before the liquid fuel reaches the membrane.

5. The ion conducting layer for fuel cells according to claim 4, wherein the content of the catalyst in the substrate gradually increases with decreasing distance to the membrane to suppress the crossover phenomenon in which the liquid fuel passes through the membrane.

6. The ion conducting layer for fuel cells according to claim 1, wherein the substrate comprises at least two substrates, the at least two substrates being different from each other in terms of at least one of porosity, pore size and material to achieve multistage physical suppression of the crossover phenomenon in which the liquid fuel passes through the membrane.

7. The ion conducting layer for fuel cells according to claim 6, wherein, among the at least two substrates, a porosity and/or a pore size of a substrate closer to the membrane is smaller than a porosity and/or a pore size of a substrate farther from the membrane.

8. The ion conducting layer for fuel cells according to claim 6, wherein the at least two substrates comprise a catalyst evenly distributed therein to achieve multistage physical and chemical suppression of the crossover phenomenon in which the liquid fuel passes through the membrane.

9. The ion conducting layer for fuel cells according to claim 6, wherein the at least two substrates comprise a catalyst such that a substrate closer to the membrane has a higher content of the catalyst than a substrate farther from the membrane to achieve multistage physical and chemical suppression of the crossover phenomenon in which the liquid fuel passes through the membrane.

10. The ion conducting layer for fuel cells according to claim 9, wherein the catalyst is not present in the substrate farther from the membrane and is present in the substrate closer to the membrane to achieve multistage physical and chemical suppression of the crossover phenomenon, in which the liquid fuel passes through the membrane, through primary physical suppression of the crossover phenomenon and secondary chemical suppression of the crossover phenomenon by allowing additional oxidation of the liquid fuel before the liquid fuel reaches the membrane.

11. An ion conductive assembly for fuel cells, comprising:
   a fuel electrode layer into which liquid fuel is introduced to allow oxidation of the liquid fuel in a fuel cell;
   the ion conducting layer for fuel cells according to claim 1; and a membrane through which ions generated by oxidation of the liquid fuel pass.

12. The ion conductive assembly for fuel cells according to claim 11, further comprising:
a fuel electrode diffusion layer supplying the liquid fuel to the fuel electrode layer.

13. A unit cell for fuel cells, comprising:
the ion conductive assembly for fuel cells according to claim 11;
an air electrode layer disposed opposite the ion conducting layer with reference to the membrane and allowing reaction between oxygen and the ions generated by oxidation of the liquid fuel and reaching the air electrode layer through the membrane; and
an air electrode diffusion layer for supplying oxygen to the air electrode layer.

14. The unit cell for fuel cells according to claim 13, further comprising:
a fuel electrode diffusion layer supplying the liquid fuel to the fuel electrode layer.

15. A stack for fuel cells, comprising:
the unit cell for fuel cells according to claim 13; and
a separator disposed at both ends of the unit cell to conduct electricity generated in the unit cell to an outside,
wherein the separator is formed with a flow path, along which the liquid fuel and the electrolyte are supplied to the fuel electrode layer.

16. A fuel cell comprising:
a stack for fuel cells comprising at least one unit cell according to claim 13 and a separator dividing the unit cell from another unit cell;
a fuel pump supplying liquid fuel to the stack; and
an air pump supplying oxygen to the stack.

17. The unit cell for fuel cells according to claim 13, wherein the membrane is a polymer electrolyte membrane (PEM), and the membrane is disposed between the fuel electrode layer and the air electrode layer.

* * * * *